United States Patent
Srinivasan

(10) Patent No.: US 8,005,000 B1
(45) Date of Patent: Aug. 23, 2011

(54) EFFECTIVE MEASUREMENT/NOTIFICATION OF SLA IN A SERVICE ORIENTED NETWORKED ENVIRONMENT

(75) Inventor: Subramanian Srinivasan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 336 days.

(21) Appl. No.: 11/697,632

(22) Filed: Apr. 6, 2007

(51) Int. Cl.
*H04L 1/00* (2006.01)
*H04L 12/28* (2006.01)
*G06F 15/16* (2006.01)
*G06F 15/173* (2006.01)

(52) U.S. Cl. ........ 370/252; 370/392; 709/231; 709/238; 709/219

(58) Field of Classification Search .......... 370/241–253, 370/401; 709/238
See application file for complete search history.

(56) References Cited

U.S. PATENT DOCUMENTS

| 6,058,102 | A * | 5/2000 | Drysdale et al. | 370/252 |
| 6,182,146 | B1 * | 1/2001 | Graham-Cumming, Jr. | 709/238 |
| 6,363,053 | B1 * | 3/2002 | Schuster et al. | 370/230 |
| 6,366,563 | B1 * | 4/2002 | Weldon et al. | 370/252 |
| 7,096,270 | B2 * | 8/2006 | Abjanic et al. | 709/229 |
| 7,814,204 | B1 * | 10/2010 | Wang et al. | 709/226 |
| 2005/0185658 | A1 * | 8/2005 | Kamiwada et al. | 370/401 |
| 2006/0090007 | A1 * | 4/2006 | Tonouchi | 709/245 |
| 2007/0011317 | A1 * | 1/2007 | Brandyburg et al. | 709/224 |
| 2007/0099634 | A1 * | 5/2007 | Chari et al. | 455/456.3 |

OTHER PUBLICATIONS

Skinner, Soap Fight: RPC vs. Document, http://www.eherenow.com, Internet Article, No Date, pp. 1-5, Bixby Consulting, Inc.

* cited by examiner

*Primary Examiner* — Seema S Rao
*Assistant Examiner* — Samina Choudhry
(74) *Attorney, Agent, or Firm* — Stolowitz Ford Cowger LLP

(57) ABSTRACT

In one embodiment, one or more network devices located on a call path for packets destined to a server running applications examines payloads included in the packets to associate different ones of the packets to different ones of the applications. Information about the packets and the associations are used to determine which ones of the applications conform to their respective Service Level Agreements (SLAs).

20 Claims, 5 Drawing Sheets

```
<?xml version="1.0" encoding="utf-8"?>
<soap:Envelope xmlns:xsi="http://www.w3.org/2001/XMLSchema-instance" xmlns:xsd="http://www.w3.org/2001/XMLSchema"
xmlns:soapenc="http://schemas.xmlsoap.org/soap/encoding/" xmlns:tns="http://eherenow.com/RPC" xmlns:types="http://
eherenow.com/RPC/encodedTypes" xmlns:soap="http://schemas.xmlsoap.org/soap/envelope/">
    <soap:Body soap:encodingStyle="http://schemas.xmlsoap.org/soap/encoding/">
        <q1:submitShoppingCart xmlns:q1="http://www.eherenow.com">
            <Where xsi:type="xsd:string">string</Where>
        </q1:submitShoppingCart >
    </soap:Body>
</soap:Envelope>
```

```
<?xml version="1.0" encoding="utf-8"?>
<soap:Envelope xmlns:xsi="http://www.w3.org/2001/XMLSchema-instance" xmlns:xsd="http://www.w3.org/2001/XMLSchema"
xmlns:soapenc="http://schemas.xmlsoap.org/soap/encoding/" xmlns:tns="http://eherenow.com/RPC" xmlns:types="http://
eherenow.com/RPC/encodedTypes" xmlns:soap="http://schemas.xmlsoap.org/soap/envelope/">
    <soap:Body soap:encodingStyle="http://schemas.xmlsoap.org/soap/encoding/">
        <q1:processPricing xmlns:q1="http://www.eherenow.com">
            <Where xsi:type="xsd:string">string</Where>
        </q1:processPricing>
    </soap:Body>
</soap:Envelope>
```

EFFECTIVE MEASUREMENT/NOTIFICATION OF SLA IN A SERVICE ORIENTED NETWORKED ENVIRONMENT

TECHNICAL FIELD

The present disclosure relates generally to the field of service oriented networking architecture.

BACKGROUND

Application vendors distribute applications such as web applications and Business-to-Business (B2B) applications to on-line businesses. The on-line businesses typically run the applications on one or more servers for operating web pages on a domain controlled by the on-line business. The applications are used by the on-line businesses to provide shopping cart functionality on the web pages, to allow product configuration functionality on the web pages, to facilitate shipping through the web pages, to check pricing, etc. The application vendor usually promises some minimum level of performance for the applications, particularly with regard to response time, number of simultaneous users, etc. This promise of minimum performance is referred to, or incorporated into, a Service Level Agreement (SLA) and may or may not be memorialized in a legal instrument.

Once the applications are being used, the parties generally attempt to benchmark or otherwise measure the performance of the applications for determining whether the performance expectations are met. Current methods include pinging the servers that run the applications as well as other techniques. Generally these current techniques are accurate only when customers of the web pages communicate using certain HyperText Transfer Protocols (HTTP) protocols, or only when each application is associated with a different Universal Resource Locator (URL). The disclosure that follows solves these and other problems.

BRIEF DESCRIPTION OF THE DRAWINGS

FIG. 1B illustrates examples of Simple Object Access Protocol (SOAP) messages for illustrating how an application association can be identified during content inspection by the network device illustrated in FIG. 1A.

DESCRIPTION OF EXAMPLE EMBODIMENTS

Overview

Figure 1A:
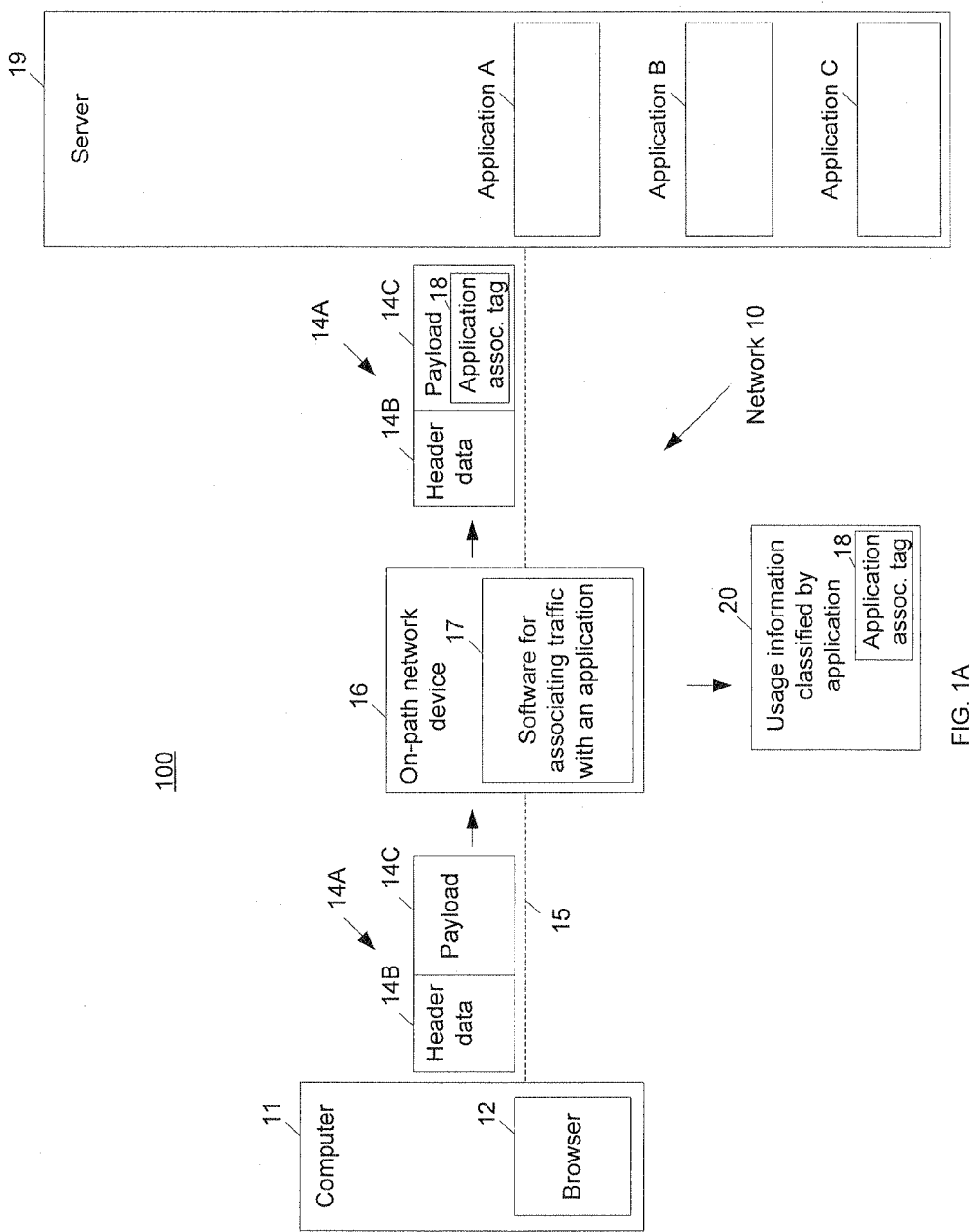
FIG. 1A illustrates an example network device for associating local traffic with applications running on a remote server.

In one embodiment, one or more network devices located on a call path for packets destined to one or more servers running applications examines payloads included in the packets to associate different ones of the packets to different ones of the applications. Information about the packets and the associations are used to determine which ones of the applications conform to their respective Service Level Agreements (SLAs).

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1A illustrates an example network device for associating local traffic with applications running on a remote server.

The system 100 includes one or more network devices such as network device 16 located on a call path 15 extending between a computer 11 and a server 19. The network device 16 includes software 17 to analyze traffic exchanged between the computer 11 and the server 19 for associating different portions of the traffic flow with different ones of the applications A-C. The network device 16 preferably sends an output 20 including the associations and measured performance indications for remote determination of whether the applications A-C are meeting a minimum level of service defined in a Service Level Agreement (SLA). Although only one network device 16 is illustrated in FIG. 1A for purposes of brevity, it should be apparent that actual systems preferably include more than one instance of the network device 16 including the software 17 and located on the call path 15.

For example, a user of computer 11 navigates a browser 12 to one of the web pages hosted by the server 19. The hosted web page may be a Business-to-Business (B2B) web page that includes more than one application such as applications A-C, which may provide shopping cart functionality, product configuration functionality, shipping selection functionality, etc. The browser 12 and the applications A-C exchange traffic as the user of computer 11 accesses the web page.

The network device 16, which may be located anywhere on the path 15 of the communication exchange, is preferably located in an Application Oriented Network (AON) router, or some other point of entry device for the computer with respect to the AON network 10 or some other network used for exchanging the communications. For example, when the computer 11 is located in a private network of a branch office, the network device 16 may be located in a router that is a single point of exit for traffic from the private network.

One function the network device 16 performs according to the software 17 is to associate the packet 14A with one or more of the applications A-C. The network device 16 may initially analyze header data 14B to determine whether a URL is included that can be used to unambiguously correlate the message with one of the applications A-C. In the present example, where more than one of the applications A-C is accessible through a same URL, additional analysis is necessary. Further analysis is also necessary when the header data 14B does not identify a URL, which may occur when the packet 14A uses Simple Object Access Protocol (SOAP) or another extensible protocol that is not required to include HyperText Transfer Protocol (HTTP) or other transport information in a message header. Extensible protocols such as SOAP may not have headers or may not otherwise include HTTP information or other transport information in a header. Extensible protocols such as SOAP may carried on several lower level protocols like TCP and Stream Control Transmission Protocol (SCTP) and on higher level protocols like Simple Mail Transport Protocol (SMTP) where there is no way to embed information on protocol headers.

Next, the network device 16 performs a deeper packet inspection that may include analyzing an application layer header included in the header data 14B and/or the payload 14C. In this deep packet inspection, which may leverage existing packet analysis techniques when the network device 16 is an AON router, the content of the packet 14A is analyzed rather than simply addressing information. The network device 16 determines whether the content of the payload 14C includes shopping cart data, shipping data, product configuration data, etc., to associate the packet 14A with a specific one (or specific ones) of the applications A-C. In other words, rather than finishing the analysis after discovering that the packet 14A is associated with one of many applications running on a single URL, the analysis continues with a content-based inspection to determine that the packet 14A is associated with a specific one of applications A, B or C. Accordingly, the network device 16 can determine an association even when a URL is not observable in the header information 14B and even when the observed URL corresponds to more than one application.

In one embodiment, during the deep packet inspection the network device 16 analyzes the content of the payload 14C by first locating a SOAP Body included in the payload 14C. Next, the network device 16 observes a service name in the first eXtensible Markup Language (XML) tag included in the SOAP body.

FIG. 1B illustrates examples of Simple Object Access Protocol (SOAP) messages for illustrating how an application association can be identified during content inspection by the network device illustrated in FIG. 1A. The SOAP message 95 includes a SOAP envelope and a SOAP body that includes the XML tag 96 identifying the message as associated with a shopping cart application. Inspecting content such as the XML tag 96 identifies the application association for the SOAP message 95. Similarly, the SOAP message 97 identifies a pricing application of the XML tag 98 included in the body.

Referring again to FIG. 1A, another function performed by the network device 16 before, after or during the inspection for making the association, is to identify performance metric information. For example, the network device 16 may track an entry time for receipt of the packet 14A on the network device 16 and an exit time for transfer of the packet 14A from the network device. The network device 16 may also track the size of the packet 14A and other information that can be used for evaluating performance of an associated application. The network device 16 may also track an amount of time for a response packet to be received back after execution of one of the applications A-C by the server 19 responsive to receipt of the packet 14A, which is particularly useful for analyzing application performance when the network device 16 is a last hop for the packet 14A.

Another function provided by the network device 16 is to insert a tag 18 or other unique identifier into the packet 14A. The tag 18 indicates which one(s) of the applications A-C are associated with the packet 14A. This tag 18 allows other network devices including the software 17 and located on the call path 15, such as an AON router located at an Internet Service Provider (ISP) for the computer 11 or an AON router located at a central office for the on-line business, to identify an association using fewer resources during deep packet inspection. For example, these other devices may identify an association by inspecting only the tag 18 rather than analyzing a significant portion of content included in the payload 14C. For compatibility reasons the tag 18 is preferably inserted into the payload 14C, but may be inserted into the header data 14B in other embodiments. The tag 18 may be observed and removed by a last hop network device located on the call path so that the tag 18 is not present when the packet 14A is received by the server 19.

Another function provided by the network device 16 is to output usage information 20 that includes the association and the performance metrics. The network device 16 may be configured to combine information for all packets in the stream before transferring the usage information 20, and may be configured to include the tag 18 within the outputted usage information 20. The outputted usage information 20 may be transferred to a remote network device located off the call path 15 for aggregation with other outputted usage information from other on-path devices having software 17. The aggregated usage information may then be analyzed to determine performance of the applications A-C.

The location of the network device 16 is preferably on the call path 15 for the communication exchange. In contrast to previous systems that utilize pinging from devices located remotely from the call path, on-path measurements provide real-time entry time and exit time measurements. These more accurate real-time measurements allow for more accurate SLA measurement/notification, which is particularly important for measuring performance in hosting environments where service providers host applications in their own networks.

Figure 2:
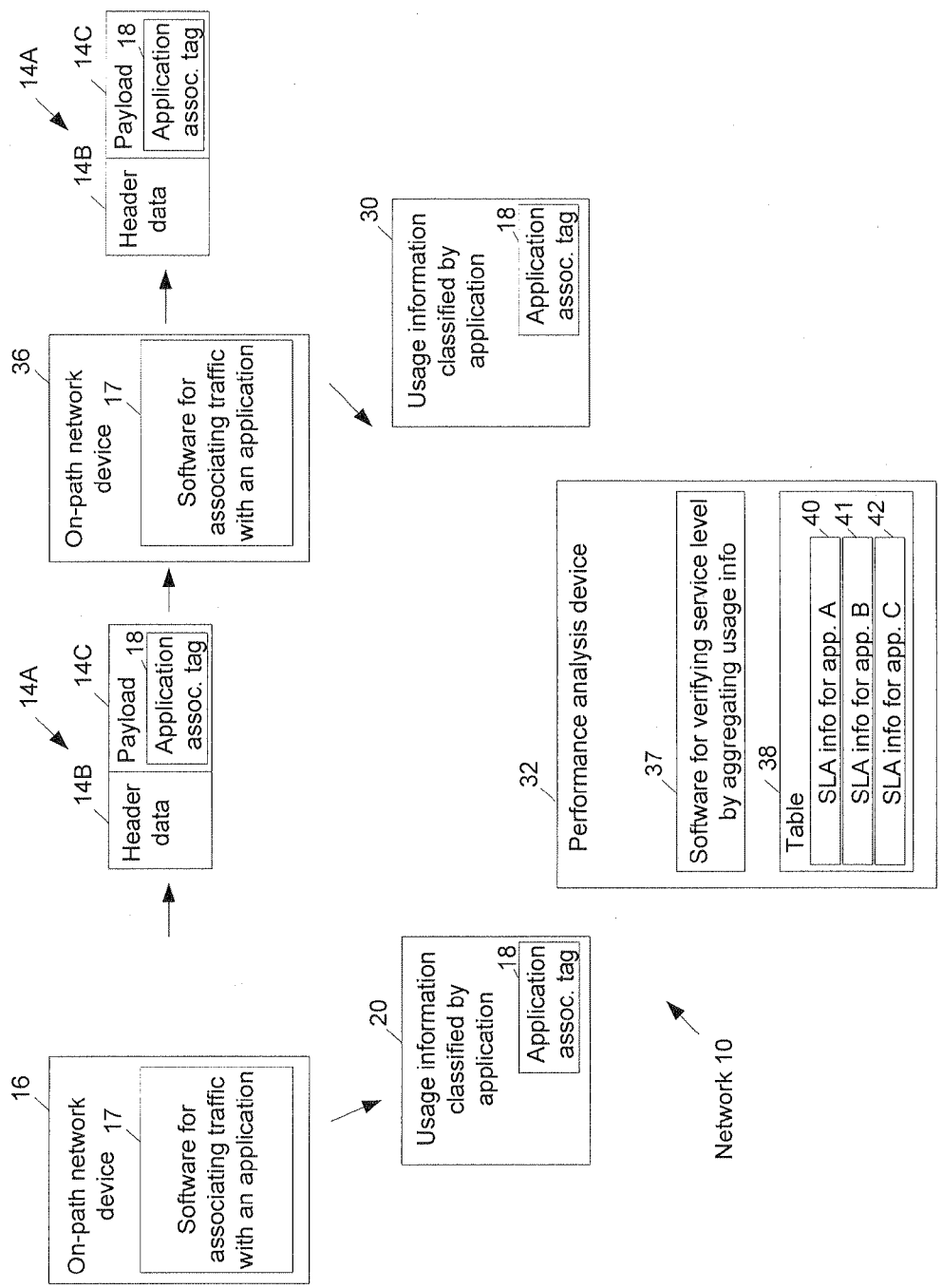
FIG. 2 illustrates an example performance analysis device for processing the associations and other information output by the network device illustrated in FIG. 1A.

FIG. 2 illustrates an example performance analysis device for processing the associations and other information output by the network device illustrated in FIG. 1A.

The performance analysis device 32 receives the usage information 20 from the network device 16. Other network devices located on the call path, such as network device 36, output usage information 30 after observing the tag 18 (or by identifying an association using other types of deep packet inspection). Preferably, performance measurements are received by the device 32 from at least a first hop branch device and a last hop data center device.

According to software 37, the device 32 uses the tags 18 to aggregate the usage information 20 and 30 with other usage information for other packets associated with a same one of the applications as the packet 14A. The aggregated performance indication is compared to a corresponding one of the entries 40-42 included in the local table 38. The device 32 observes whether the applications A-C are meeting SLA requirements according to the comparison. In other embodiments, the SLA information contained in the entries 40-42 may instead be located at another device and the device 32 may transfer the aggregated performance indication for remote comparison.

When one of the applications A-C is not meeting an SLA requirement, or not exceeding an SLA requirement by a sufficient margin, the device 32 may output an indication of the insufficient performance to a workload manager. The workload manager may then dynamically modify the configuration of routers or other devices in the AON network to improve application performance for meeting an SLA requirement.

In other embodiments, the aggregation and comparison may be performed by one of the on-path devices such as network devices 16 and 36. In such an embodiment, one of the on-path devices receives outputted information from the other on-path devices. In yet other embodiments, a single network device may compare locally gathered performance measurements to SLA requirements stored locally without aggregating information received from other devices and without outputting information for aggregation by other devices. Also, in other embodiments, any one of the measuring on-path devices may dynamically modify router configuration to improve application performance.

Figure 3:
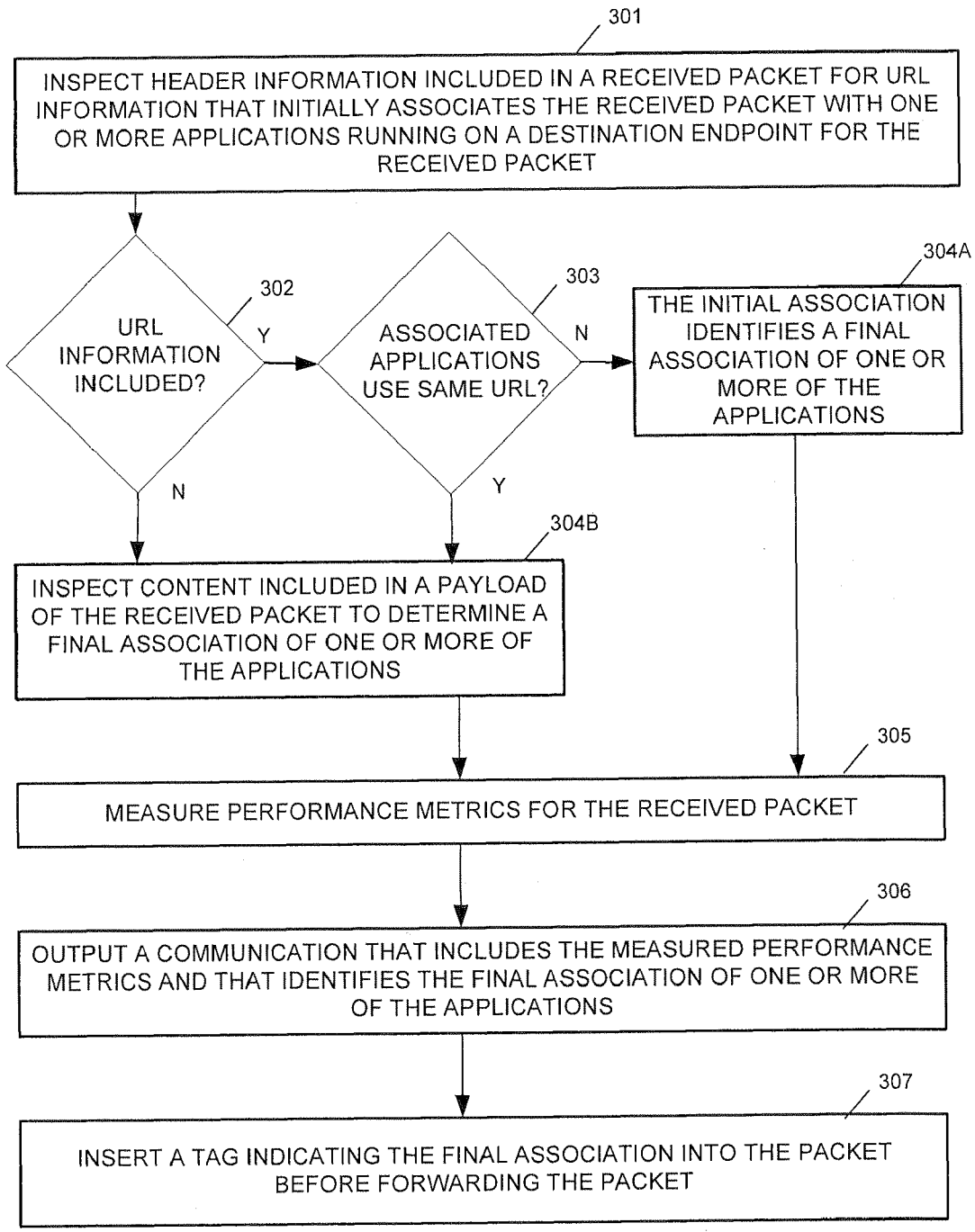
FIG. 3 illustrates an example method for using the network device illustrated in FIGS. 1A and 2.

FIG. 3 illustrates an example method for using the network device illustrated in FIGS. 1A and 2.

In block 301, the network device 16 inspects header information included in a received packet for URL information that initially associates the received packet with one or more applications running on a destination endpoint for the received packet. When URL information is included in block 302, the network device 16 determines whether the associated applications are accessible using a same URL or otherwise located on a same web page in block 303. When additional inspection is not needed in block 303, the network device 16 observes that the initial association identifies a final association of one or more of the applications in block 304A.

When the URL information is not included in block 302, the network device 16 performs deeper packet inspection, for example by inspecting content included in a payload of the received packet, to determine a final association of one or more of the applications in block 304B. The deeper packet inspection in block 304B is also used when the additional inspection in block 303 is needed.

In block 305, the network device 16 measures performance metrics for the received packet. The network device 16 outputs a communication that includes the measured performance metrics and that identifies the final association of one or more of the applications in block 306. In block 307, the network device 16 may insert a tag indicating the final association before forwarding the packet.

Figure 4:
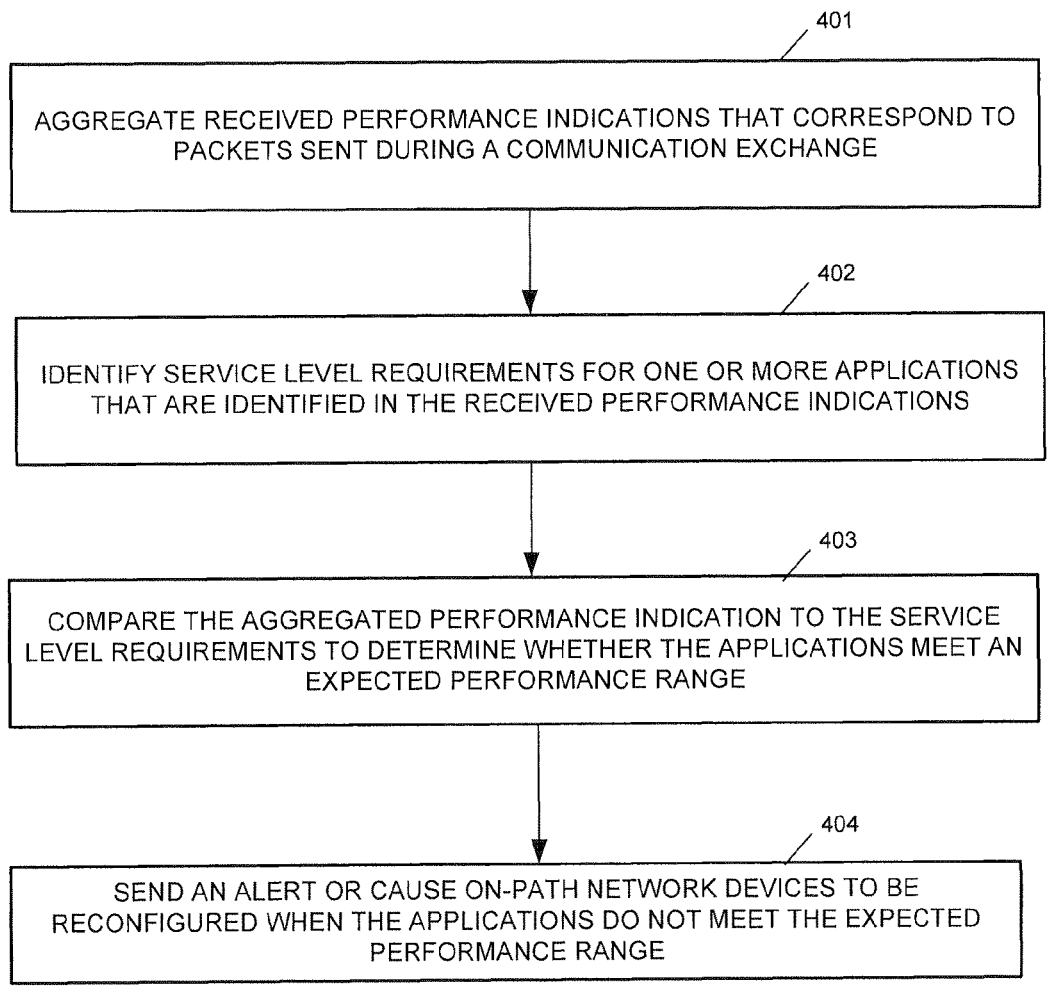
FIG. 4 illustrates an example method for using the performance analysis device illustrated in FIG. 2.

FIG. 4 illustrates an example method for using the performance analysis device illustrated in FIG. 2.

In block 401, the device 32 aggregates received performance indications that correspond to packets sent during a communication exchange. The device 32 identifies service level requirements for one or more applications that are identified in the received performance indications in block 402. The device 32 compares the aggregated performance indication to the identified service level requirements to determine whether the applications meet a performance expectation in block 403. In block 404, the device 32 sends an alert to notify a user/administrator or causes on-path network devices to be reconfigured when the applications do not meet the performance expectations.

The specific examples described herein included determining performance of applications; however, this should not be interpreted as limiting other embodiments. In other embodiments, performance of any applications or services can be measured, such as email services, routing services, network services, etc. The performance expectations referred to throughout may refer to expectations for a single application running on one or more servers or performance expectations for a solution that spans across multiple components such as web servers, applications servers and databases.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A system comprising:
a network device configured to:
perform an initial inspection of a received packet by analyzing a header of the received packet to locate a particular Uniform Resource Locator (URL) in the header, and if the particular URL is present, compare the particular URL to stored associations between URLs and a plurality of applications operating on at least one remote endpoint;
if the particular URL is not present in the header, perform a subsequent inspection of the received packet by analyzing a payload of the received packet, the payload being data encapsulated by the header;
based on the initial inspection or the subsequent inspection, correlate the received packet to a particular one of the plurality of applications operating on the at least one remote endpoint according to the initial inspection or the subsequent inspection;
after the correlation, insert a data pattern into the payload, wherein the data pattern stores the correlation between the particular one of the applications and the packet; and
forward the received packet having the data pattern inserted therein.

2. The system of claim 1, wherein the inserted data pattern allows another network device operating on a path extending between the network device and the at least one remote endpoint to correlate the packet with the particular application by identifying the inserted data pattern.

3. The system of claim 1, wherein the network device is configured to:
   during the subsequent inspection of the data encapsulated by the header, determine whether the data includes any data patterns inserted by remote network devices, and if present, correlate the particular one of the plurality of applications based on the included data pattern.

4. The system of claim 1, wherein the network device is configured to:
   measure performance metrics for the received packet;
   generate a communication containing information about the performance metrics;
   insert the data pattern into the communication; and
   send the communication containing the information and the data pattern for remote analysis.

5. The system of claim 4, further comprising:
   an aggregation device configured to:
   aggregate the information for the performance of the particular application with information sent from other on-path network devices that forwarded packets correlated to the particular application; and
   determine whether a service level requirement for the particular application is met according to the aggregated performance information.

6. The system of claim 5, wherein the aggregation device is configured to:
   generate and send control signals to re-configure said network device or one of the other on-path network devices according to said determination.

7. A system comprising:
   means for performing an initial inspection of a received packet by analyzing a header of the received packet to locate a particular Uniform Resource Locator (URL) in the header to be compared to stored associations between URLs and a plurality of applications operating on at least one remote endpoint;
   means for performing a subsequent inspection of the received packet by analyzing a payload of the received packet, the payload being data encapsulated by the header, if the particular URL is not present in the header;
   means for correlating the received packet to a particular one of the plurality of applications operating on the at least one remote endpoint according to the initial inspection or the subsequent inspection;
   means for inserting a data pattern into the payload after the correlation, wherein the data pattern stores the correlation between the particular one of the applications and the packet; and
   means for forwarding the received packet having the data pattern inserted therein.

8. The system of claim 7, wherein the inserted data pattern allows another network device operating on a path extending between the network device and the at least one remote endpoint to correlate the packet with the particular application by identifying the inserted data pattern.

9. The system of claim 7, further comprising: means for determining whether the data includes any data patterns inserted by remote network devices during the subsequent inspection of the data encapsulated by the header, and if present, processing the included data pattern to make the correlation.

10. The system of claim 7, further comprising:
    means for measuring performance metrics for the received packet;
    means for generating a communication containing information about the performance metrics;
    means for inserting the data pattern into the communication; and
    means for sending the communication containing the information and the data pattern for remote analysis.

11. The system of claim 10, further comprising:
    means for aggregating the information for the performance of the particular application with information sent from other on-path network devices that forwarded packets correlated to the particular application; and
    means for determining whether a service level requirement for the particular application is met according to the aggregated performance information.

12. The system of claim 11, further comprising:
    means for generating and sending control signals to re-configure said network device or one of the other on-path network devices according to said determination.

13. The system of claim 1, further comprising an additional network device located remotely with respect to said network device, wherein the additional network device is configured to:
    receive the packet forwarded from said network device; and
    remove the data pattern from the encapsulated data before forwarding the packet to a remote destination for the packet.

14. The system of claim 7, wherein the data pattern is inserted by a first intermediary on a path extending from an origination source of the packet and a destination of the packet, and wherein the system further comprises:
    means for receiving the forwarded packet and removing the data pattern therefrom before forwarding the data packet to the destination.

15. A method, comprising:
    performing, using a network device, an initial inspection of a received packet by analyzing a header of the received packet to locate a particular Uniform Resource Locator (URL) in the header to be compared to stored associations between URLs and a plurality of applications operating on at least one remote endpoint;
    performing, using the network device, a subsequent inspection of the received packet by analyzing a payload of the received packet, the payload being data encapsulated by the header if the particular URL is not present in the header;
    based on the initial inspection or the subsequent inspection, categorizing, using the network device, the received packet to a particular one of the plurality of applications operating on the at least one remote endpoint according to the initial inspection or the subsequent inspection;
    after the categorization, inserting, using the network device, a data pattern into the payload, wherein the data pattern stores said categorization;
    forwarding, using the network device, the received packet having the data pattern inserted therein;
    wherein the data pattern is inserted by a first intermediary on a path extending from an origination source of the packet and a destination of the packet;
    receiving the forwarded packet at a second intermediary remote from the first intermediary and removing, using the second intermediary, the data pattern from the packet before forwarding the packet to the destination.

16. The method of claim 15, wherein the inserted data pattern allows another network device operating on a path extending between the network device and the at least one remote endpoint to categorize the packet with the particular application by identifying the inserted data pattern.

17. The method of claim 15, further comprising:
determining whether the data includes any data patterns inserted by remote network devices during the subsequent inspection of the data encapsulated by the header, and if present, processing the included data pattern to make the categorization.

18. The method of claim 15, further comprising:
measuring performance metrics for the received packet; generating a communication containing information about the performance metrics; inserting the data pattern into the communication; and
sending the communication containing the information and the data pattern for remote analysis.

19. The method of claim 18, further comprising:
aggregating the information for the performance of the particular application with information sent from other on-path network devices that forwarded packets categorized to the particular application; and
determining whether a service level requirement for the particular application is met according to the aggregated performance information.

20. The method of claim 19, further comprising:
generating and sending control signals to re-configure said network device or one of the other on-path network devices according to said determination.

* * * * *